Jan. 24, 1961  H. M. FINNISTON ET AL  2,969,309
NEUTRONIC REACTOR FUEL ELEMENT AND METHOD OF MANUFACTURE
Filed Feb. 21, 1950
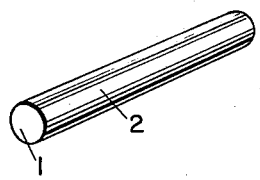
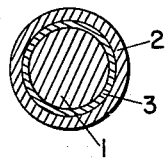
INVENTORS
HAROLD MONTAGUE FINNISTON
OLIVER SIDNEY PLAIL
BY
ATTORNEY

United States Patent Office 2,969,309
Patented Jan. 24, 1961

2,969,309

NEUTRONIC REACTOR FUEL ELEMENT AND METHOD OF MANUFACTURE

Harold Montague Finniston and Oliver Sidney Plail, London, England, assignors, by mesne assignments, to the United States of America as represented by the United States Atomic Energy Commission Filed Feb. 21, 1950, Ser. No. 145,408

15 Claims. (Cl. 204—193.2)

This invention relates to the production of uranium bodies for use in nuclear fission reactors and particularly to the production of such uranium bodies as comprise a shaped mass of uranium metal enclosed in a protective metallic sheath or envelope.

A form of such a uranium body which has been employed in nuclear reactors consists of a rod of uranium metal enclosed in a sealed can of relatively thin aluminium. To improve contact between the aluminium and the uranium, and so facilitate passage of heat from the uranium, drawing of the can by passage of the canned uranium through a die has been practised. Bonding of the aluminium can to the uranium would result in more satisfactory conduction of heat from the body, but attempts to bond uranium masses to thin aluminium sheaths have not resulted in practical sheathed bodies for operation at temperatures of several hundred degrees centigrade. Thermal contact between uranium masses and unbonded aluminium cans has not been found to be consistently good; and the contact itself is a source of possible failure of the uranium body, since there is a tendency for uranium-aluminium alloy to form at the region of contact at temperatures which are possible in nuclear reactors, and alloy formation has been attended by localised swellings of the can, which are liable to develop into perforations.

In the case of other metals than aluminium which may be employed for sheathing uranium rods, direct bonding of the sheath to the uranium, although advantageous in promoting heat transfer, may not prove desirable or practicable.

It is an object of the invention to provide a uranium body having a protective metallic sheath or envelope in which advantages of direct bonding of the sheath or envelope may be obtained without direct contact of the two.

According to the invention a uranium body for use in a nuclear fission reactor comprises a mass of uranium, a protective sheath or envelope of metal and a thin layer of a metal or alloy between the uranium and the sheath and bonded thereto, the metal of the layer being one which diffuses readily into uranium and the metal of the sheath at elevated temperatures, for example 400° C. to 800° C.

In the case of an aluminium sheath, the metal of the layer preferably has a melting point higher than that of aluminium and does not diffuse rapidly into aluminium or uranium or vice versa at temperatures of operation of nuclear reactors, for example up to 300° C.

Also in accordance with the invention a uranium body comprising a mass of uranium enclosed in a metallic envelope or sheath is produced by applying to a uranium mass a thin coating of a metal which diffuses into uranium and the metal of the sheath readily at elevated temperatures, for example 400° C. to 800° C. heating the coated uranium mass to an elevated temperature to promote diffusion at the interface, sealing the treated uranium mass in the sheath or envelope and heating the assembly in a tight fitting container to cause the metal of the sheath or envelope and the coating metal to diffuse into each other.

The metal of the layer in general should not form an alloy with the sheath metal of uranium of a melting point lower than the operating temperature of the nuclear reactor, for example lower than 300–400° C. It should diffuse into uranium and the sheath metal, and uranium and the sheath metal diffuse into it, reasonably rapidly at raised temperatures, for example from 400° to 800° C. so that bonding may be effected at such temperatures in several hours; but diffusion should not be rapid at nuclear reactor operating temperatures, for example up to 300° C. The alloy layers resulting from the diffusion of the said metal into uranium and the sheath metal should be sufficiently ductile to withstand thermal stresses involved in the production of the uranium bodies and their use in a nuclear reactor. The metal layer should have a low competitive neutron absorption.

The thin layer of metal may be applied to the clean surface of the uranium mass by electrodeposition, by evaporation of the metal in vacuum or by chemical means. The layer may then be bonded to the uranium by heating the composite mass, in vacuo or in a protective atmosphere, to allow diffusion at the interface. Temperatures between 500° C. and 800° C. have been found suitable for this purpose. An aluminium sheath or other metal sheath may then be cast in position about the mass A bond will be formed between the metal layer and the aluminium or other metal sheath by diffusion across the boundary. Alternatively, a uranium mass with its bonded layer of metal may be provided with a sheath of aluminium or other metal, e.g. magnesium by ordinary canning methods and the sheath drawn down into close contact with the metal layer. A bond between the metal layer and the sheath may then be produced by promoting diffusion across the metal sheath boundary by heating the assembly in a tightly fitting container to a temperature of from 300° to 600° C.

Examples of metals which may be employed for the layer between uranium and sheath metal e.g. aluminium, are nickel, cobalt and iron. A layer thickness of the order of substantially 0.001 inch or more is desirable for effective bonding with the uranium and the aluminium without the formation of interface compounds or alloys of uranium and aluminium, although since the layer metal constitutes an additional absorber of thermal neutrons it is preferable to adopt a thickness as small as is consistent with the making of a sound bond. Alternative metals or alloys for the sheath are beryllium, zirconium and magnesium, and aluminum-magnesium alloy.

The following is an example of a preferred way of carrying the invention into effect as applied to a uranium rod sheathed in aluminium.

Example

A uranium rod is attached at one end to mild steel carrier to allow of the rod being treated without being touched by hand. The rod is degreased by immersion in acetone for about one minute and then suspended by the carrier from a central anode bar of an electrolytic cell having two graphite plates arranged on either side as cathodes. The electrolyte employed is a 10 percent aqueous citric acid solution and electrolysis is allowed to process for one or two minutes to clean the uranium bar. The bar is removed by means of its carrier, rinsed in water drained and introduced into an electrolytic cell suitable for nickel plating the bar being made the cathode. The electrolyte may be a sulphate bath as ordinarily employed for electroplating nickel. A deposit of 0.001 inch or somewhat less is laid on the uranium bar and the latter is removed from the electrolyte, rinsed and dried. The plated rod is heated in vacuo or an atmosphere of argon to a temperature of substantially 650° C. for substantially two hours to bring about diffusion of metal across the nickel-uranium interface.

An aluminium can of a size just to admit the uranium rod is degreased in trichlorethylene vapour for five minutes and then in liquid trichlorethylene for five minutes. It is then immersed in a five percent aqueous caustic soda solution at approximately 60° C. for substantially two minutes, washed in water, drained and immersed in a nitric acid solution of 40 to 70 percent concentration for at least one minute. The can is then withdrawn, allowed to drain, washed with cold water and then hot water and after draining dried in an oven at 100° C. to 150° C. for at least 20 minutes.

The treated uranium rod is introduced into the aluminium can and a closure of aluminium is sealed over the open end as by welding or soldering. The canned rod is introduced into a tight fitting or split steel sleeve graphitised internally to prevent adhesion of the sleeve face to the can wall. The assembly is then heated to substantially 500° C. for three hours to promote diffusion of the aluminium into the nickel layer and vice versa.

Alternatively the nickel film may be applied to the uranium rod by evaporation in vacuo.

In a manner similar to that described in the example a uranium mass enclosed in an aluminium envelope may be bonded to the envelope by means of a thin layer of cobalt or iron.

Bodies of the invention are illustrated in the accompanying drawing, in which:

Fig. 1 is a perspective view of a body, and
Fig. 2 is a cross-section thereof.

The body consists of a cylindrical core of uranium 1 and a protective envelope 2 of aluminium, beryllium or other suitable metal as hereinbefore specified, and a thin layer 3 of nickel, cobalt, iron or the like. The thickness of envelope 2 and layer 3 is greatly exaggerated in the drawing.

We claim:

1. A uranium body for use in a nuclear fission reactor comprising a homogeneous rod of uranium metal enclosed in an envelope of aluminium, wherein a thin metallic layer of higher melting point than aluminium and of relatively low competitive neutron absorbtion between the uranium and the aluminium is bonded to the uranium and to the aluminium of the sheath.

2. A uranium body for use in a nuclear fission reactor comprising a homogeneous rod of uranium metal, an envelope of aluminium enclosing the mass of uranium and a thin layer of nickel between the uranium and the envelope, the nickel being bonded to the uranium and to the aluminium of the sheath.

3. A uranium body for use in a nuclear fission reactor comprising a homogeneous rod of uranium metal, an envelope enclosing the mass of uranium and a thin layer of cobalt between the uranium and the envelope, the cobalt being bonded to the uranium and to the aluminium of the sheath.

4. A uranium body for use in a nuclear fission reactor comprising a homogeneous rod of uranium metal, an envelope of aluminium enclosing the mass of uranium and a thin layer of iron between the uranium and the envelope, the iron being bonded to the uranium and to the aluminium.

5. A uranium body for use in a nuclear fission reactor which comprises a homogeneous rod of uranium metal, a protective envelope of metal of the group consisting of aluminium, beryllium, magnesium, and aluminium-magnesium alloy for the uranium and a thin layer of a further metal of low competitive neutron absorption between the uranium and the envelope bonded to the envelope and the uranium.

6. A uranium body for use in a nuclear fission reactor which comprises a homogeneous rod of uranium metal, a protective metallic envelope for the uranium and a thin layer of nickel between the uranium and the envelope, the nickel being bonded to the uranium and to the metal of the sheath.

7. A uranium body for use in a nuclear fission reactor which comprises a homogeneous rod of uranium metal, a protective metallic envelope for the uranium and a thin layer of cobalt between the uranium and the envelope, the cobalt being bonded to the uranium and to the metal of the sheath.

8. A uranium body for use in a nuclear fission reactor which comprises a homogeneous rod of uranium metal, a protective metallic envelope for the uranium and a thin layer of iron between the uranium and the envelope, the iron being bonded to the uranium and to the metal of the sheath.

9. A method of producing a uranium body for use in a nuclear fission reactor, which comprises a homogeneous rod of uranium metal within a protective metallic envelope, the method including the steps of applying to the uranium a thin metallic coating capable of readily diffusing into uranium and the metal of the envelope at an elevated temperature of substantially 400° C. to 800° C., heating the coated uranium in non-reactive surroundings to such elevated temperature to cause diffusion of the coating metal into the uranium, introducing the treated uranium into a preformed envelope, closing and sealing the envelope and heating the assembly to substantially 500° C. for several hours while contained in a tight-fitting container to cause the metal of the envelope and the coating metal to diffuse into each other.

10. A method of producing a uranium body comprising a homogeneous rod of uranium metal within a protective envelope of aluminium which comprises applying to the uranium a thin metallic coating heating the coated uranium in non-reactive surroundings to 400° C. to 800° C. to cause diffusion of the coating metal into the uranium, applying a preformed envelope of aluminium to the treated uranium, and heating the assembly to substantially 500° C. for several hours while contained in a tight fitting container to cause the aluminium and the coating metal to diffuse into each other.

11. A method according to claim 10 wherein the coating metal is nickel.

12. A method according to claim 10 wherein the coating metal is cobalt.

13. A method according to claim 10 wherein the coating metal is iron.

14. A method according to claim 9 wherein the coated uranium is heated to the elevated temperature for substantially two hours.

15. A method according to claim 9 wherein the assembly is heated for substantially three hours.

References Cited in the file of this patent

UNITED STATES PATENTS 2,266,330   Nachtman _____ Dec. 16, 1941

FOREIGN PATENTS 861,390   France _____ Oct. 28, 1940